US010825270B2

(12) United States Patent
Lalande et al.

(10) Patent No.: US 10,825,270 B2
(45) Date of Patent: Nov. 3, 2020

(54) VEHICULAR PERSONNEL ACCOUNTABILITY AND SAFETY SYSTEM

(71) Applicant: LifePASS Inc., Youngsville, LA (US)

(72) Inventors: Dwayne Lalande, Lafayette, LA (US); Kirk Landry, New Iberia, LA (US); Carroll Raymond, Jr., Youngsville, LA (US); James Roy, Jr., Lafayette, LA (US); Brad M Pilecki, Youngsville, LA (US)

(73) Assignee: LIFEPASS, INC., Youngsville, LA (US)

( * ) Notice: Subject to any disclaimer, the term of this patent is extended or adjusted under 35 U.S.C. 154(b) by 367 days.

(21) Appl. No.: 15/867,426

(22) Filed: Jan. 10, 2018

(65) Prior Publication Data

US 2018/0197353 A1 Jul. 12, 2018

Related U.S. Application Data

(60) Provisional application No. 62/444,678, filed on Jan. 10, 2017.

(51) Int. Cl.
*G07C 5/08* (2006.01)
*G06K 9/00* (2006.01)
(Continued)

(52) U.S. Cl.
CPC .............. *G07C 5/085* (2013.01); *B60K 28/06* (2013.01); *B60W 40/09* (2013.01); *G05D 1/0022* (2013.01); *G05D 1/0027* (2013.01); *G06F 1/163* (2013.01); *G06K 9/00845* (2013.01); *G06K 9/00885* (2013.01); *G07C 5/008* (2013.01); *H04W 4/029* (2018.02); *H04W 4/44* (2018.02);
(Continued)

(58) Field of Classification Search
CPC ........ G07C 5/085; G07C 5/008; B60K 28/06; H04W 4/44; H04W 4/029; H04W 4/025; H04W 4/80; G06K 9/00845; G06K 9/00885; G06K 2009/00939; G05D 1/0027; G05D 1/0022; G06F 1/163; B60W 2540/26; B60W 2540/22
USPC .......................................................... 701/2
See application file for complete search history.

(56) References Cited

U.S. PATENT DOCUMENTS 5,363,302 A * 11/1994 Allen ................... B60R 21/0132
180/282
2004/0027331 A1* 2/2004 Mochizuki ............ G06F 1/1616
345/161

(Continued)

*Primary Examiner* — Marthe Y Marc-Coleman
(74) *Attorney, Agent, or Firm* — Matthews, Lawson, McCutcheon & Joseph, PLLC

(57) ABSTRACT

A system and method for monitoring fleets of vehicles and vehicle operators is disclosed. A vehicle is installed with device(s) collecting positional data such as vehicle movement and orientation with respect to other vehicles and road hazards. In addition, the vehicle operator is fitted with wearable device(s) collecting biometric data (e.g., heart rate). These devices are in communication with each other, as well as a hard drive on the vehicle (e.g., a black-box) and a wireless monitoring station located at a distance. In an embodiment, the device(s) are connected to the braking system of the truck to allow emergency braking in the event of a loss of control on the part of the vehicle or consciousness on the part of the driver. In a further embodiment, this control may also be asserted by the land-based monitoring system.

10 Claims, 2 Drawing Sheets

(51) Int. Cl.
*G07C 5/00* (2006.01)
*B60W 40/09* (2012.01)
*G05D 1/00* (2006.01)
*G06F 1/16* (2006.01)
*H04W 4/029* (2018.01)
*H04W 4/44* (2018.01)
*B60K 28/06* (2006.01)
*H04W 4/80* (2018.01)
*H04W 4/02* (2018.01)

(52) U.S. Cl.
CPC ..... *B60W 2540/22* (2013.01); *B60W 2540/26* (2013.01); *G06K 2009/00939* (2013.01); *H04W 4/025* (2013.01); *H04W 4/80* (2018.02)

(56) References Cited

U.S. PATENT DOCUMENTS

| | | | | |
|---|---|---|---|---|
| 2014/0074383 | A1* | 3/2014 | Frey | G08B 21/14 |
| | | | | 701/110 |
| 2016/0163133 | A1* | 6/2016 | Ricci | G01C 21/3484 |
| | | | | 701/33.4 |
| 2017/0335781 | A1* | 11/2017 | Augusty | G08B 21/14 |

* cited by examiner

VEHICULAR PERSONNEL ACCOUNTABILITY AND SAFETY SYSTEM

PRIORITY

The present application is a non-provisional application claiming priority to U.S. Provisional Application No. 62/444,678, filed 10 Jan. 2017 and entitled "Vehicular Personnel Accountability & Safety System." The full contents of the above-named application are incorporated herein by reference.

FIELD

The present invention relates, generally, to a method for enhancing safety in a fleet of transport vehicles or other mobile equipment comprising a remote biometric monitoring system for the operator in which a safety factor is continually calculated from a plurality of biometric signals, as well as a remote control and/or shutdown capability for the vehicle when the safety factor exceeds a predetermined safety threshold.

BACKGROUND

The field of commercial shipping, transportation, and delivery is well-known to be hazardous, accounting for close to 10% of all workplace fatalities according to recent US Department of Labor statistics. In addition to the danger posed by fatal accidents, less-than-fatal accidents often result in injury, illness, and considerable liabilities for companies who have to balance efficiency with the welfare of their workers.

In addition to inclement weather and vehicle breakdowns, a prominent cause of accidents in the transportation industry is psychological stress. Operators often suffer from sleep disorders which result from prolonged periods of stress, fatigue, and long hours. This is linked to compromised judgment and risk-taking behavior.

"Connected Vehicle" (CV) technologies have recently been developed which can monitor an operator and a vehicle and provide an extra degree of safety. While in the long-term, these CV technologies will likely lead to an operator-less autonomous driving network, in the short-term, they are useful for enhancing the safety of human operators by collecting data from both the operator and the vehicle. Examples of such technologies can be found in U.S. Pat. No. 8,976,744 to Yousefi, et al., for a vehicle data collection system, and EP Patent No. 3,092,631 to Tanaka, et al., for biometric data collection.

However, at present, most of these CV technologies are passive; they do not attempt to actively intercede in a dangerous situation, but simply to monitor the vehicle and the operator and react to poor decisions by the operator (e.g., emergency braking in the instance of collision detection). A need therefore exists to monitor the operator's state and possibly prevent a faulty driving decision from being made in the first place.

Embodiments described in the present application meet this need.

SUMMARY OF THE INVENTION

The present invention relates, generally, to a vehicle tracking and control system for ensuring the safety of vehicles and vehicle operators in a transport fleet.

In an embodiment, the system comprises at least one electronic control module collecting telemetry from a vehicle, and at least one wearable module collecting biometric data from each operator of each vehicle. A control center receives the telemetry and biometric measurements, while a processor (which may be either proximate to the vehicle or remotely located at the control center) continuously analyzes the telemetry and biometric data and is capable of intiating a shutdown of the vehicle when either the telemetry measurements, biometric measurements, or both, exceed a predetermined threshold. The biometric measurements may be collected by way of a primary and a secondary wearable device, and may collect such data as pulse rate, blood pressure, oxygen saturation, perspiration levels, temperature, or combinations thereof. The telemetry measurements may be collected by cameras, laser sensors, radar sensors, or ultrasonic sensors located on the vehicle. Additionally, an environmental sensor may be present as well, which can initiate shutdown based on an excessive level of a pollutant. Optionally, there may be an additional intermediate "stressed" threshold between the "normal" baselines and the "critical" threshold which triggers an intervention short of shutdown (e.g., a signal to the control center to contact the driver). Optionally, these thresholds may be specific to the individual driver based on baseline biometric data collected during physical examination, and updated with additional biometric data as it is collected under normal operating circumstances. The telemetry and biometrics may be transmitted to the control center by means of any suitable wireless technology, including any combination of RFID, Bluetooth, Wi-Fi, LTE, GPS, or combinations thereof.

The above general descriptions and the following detailed descriptions are merely illustrative of the generic invention, and additional modes, advantages, and particulars of this invention will be readily suggested to those skilled in the art without departing from the spirit and scope of the invention.

BRIEF DESCRIPTION OF THE DRAWINGS

In the detailed description of various embodiments usable within the scope of the present disclosure, presented below, reference is made to the accompanying drawings, in which.

DETAILED DESCRIPTION OF THE EMBODIMENTS

Before describing selected embodiments of the present disclosure in detail, it is to be understood that the present invention is not limited to the particular embodiments described herein. The disclosure herein is illustrative of one or more presently preferred embodiments and variations thereof, and it will be appreciated by those skilled in the art that various changes may be made without departing from the spirit of the invention.

As well, it should be understood the drawings are intended to illustrate and plainly disclose presently preferred embodiments to one of skill in the art, but are not intended to be manufacturing level drawings or renditions of final products and the relative size and arrangement of the components may differ from that shown and still operate within the spirit of the invention.

Moreover, it will be understood that various directions such as "upper," "lower," "bottom," "top," "left," "right," and so forth are made only with respect to explanation in conjunction with the drawings to be illustrative and non-limiting, and that the components may be oriented differently, for instance, during transportation and manufacturing as well as operation.

Operator Biometrics

The primary subsystem of the present invention comprises wearable user devices and the data collected therefrom, which would be present on every operator and continuously generating data to allow an operator's biometric data, as well as various physical data such as location and movement speed, to be monitored in real time.

Figure 1:
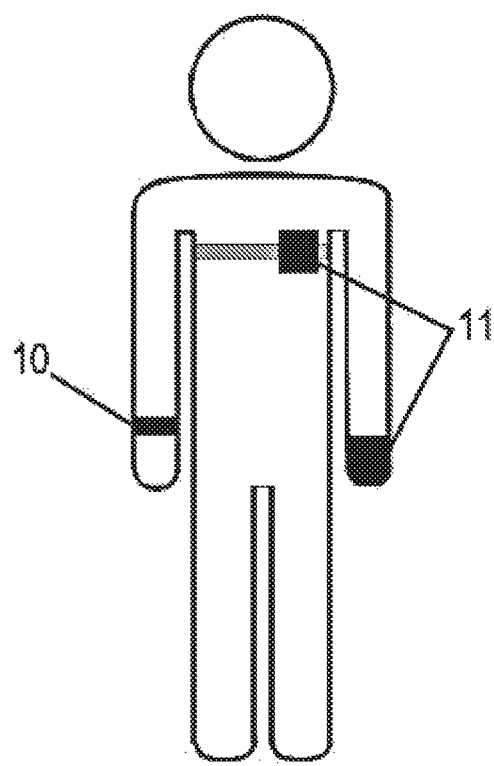
FIG. 1 depicts a diagram of a wearable device usable with an embodiment of the present invention.

Turning now to FIG. 1, the primary biometric device 10 can consist of a wristwatch-style band worn by the operator in a manner similar to a commercial activity tracker, which is well-known in the art. Wrist monitors have the technology to act as biometric monitors for a variety of data points, including pulse rate, blood pressure, oxygen saturation, and others. These monitors usually comprise a sensing devices embedded in the band of the watch and at least one wrist display acting as the watch face.

In an embodiment, the primary biometric device 10 is accompanied by secondary biometric device 11. Secondary biometric device 11 may comprise a glove-style wearable for greater sensitivity and accuracy, or a torso wearable which can accommodate larger sensors or larger batteries and also more accurately measure physical data. For instance, an accelerometer would provide more accurate data when worn on the torso than on the wrist or hand, as the normal hand movements of driving would introduce substantial noise into the data set.

It should be understood that the depicted exemplary locations of the biometric devices 10, 11 are merely illustrative, and that embodiments usable within the scope of the present disclosure can include wearable biometric devices incorporated into any location on or near the body, within any type of clothing or jewelry, including shirts, pants, undergarments, shoes, neckwear, etc. Headsets, which are already commonly utilized by vehicle operators, may be retrofitted with biometric devices. Any location may be used in which the biometric devices 10, 11 are wearable in a manner that does not interfere with the movement or undertakings of the individual.

In an embodiment, primary biometric device 10 and secondary biometric device 11 may be used simultaneously, each collecting the readings most suited to the location of the wearable, and providing confirmation and calibration checks for each other. In another embodiment, secondary biometric device 11 acts as a backup for primary biometric device 11 and is not generally active. It is envision that this backup configuration would be suitable for shorter distances or operators who have already proven reliable, while the simultaneous configuration would be suitable for longer-haul drives or newer operators who may be more susceptible to stress-induced decision errors.

Figure 2:
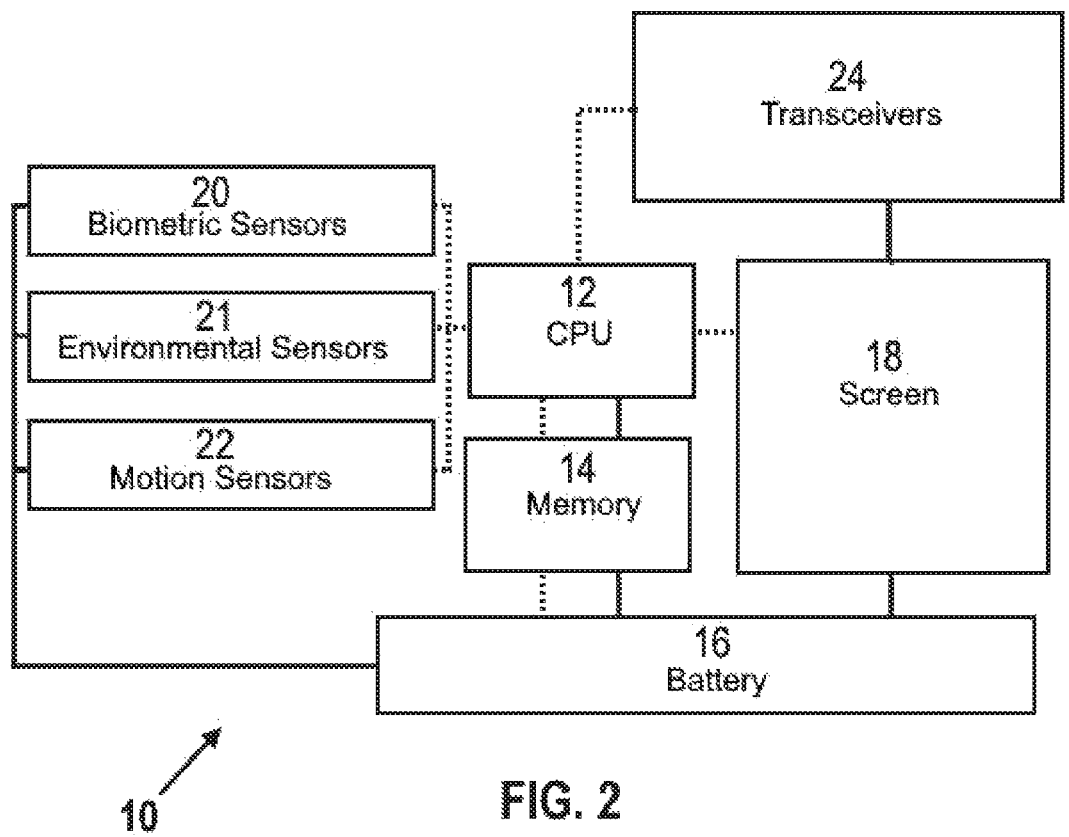
FIG. 2 depicts a block diagram of the wearable device inputs and outputs associated with the diagram of FIG. 1.

Turning now to FIG. 2, a block diagram of an exemplary primary biometric device 10 is shown. In the diagram in FIG. 2, dashed lines represent data while solid lines represent power connections. Biometric device 10 comprises a processor 12, memory 14, battery 16, and a screen 18. Processor 12 coordinates sensor input from biometric sensors 20, environment sensors 21, and motion sensors 22, and manages the storage of that information in memory 14, as well as the transmission of that information through transceivers 24. Memory 14 comprises both static identification data (e.g., name, height, weight, employer ID) and real-time data received from sensors 20, 21, 22, which is stored on the local memory module as a "black box" style backup and check against the data being sent through transceivers 24 and recorded at a distance.

In an embodiment, the stress analysis and calculation of the stress factor is performed locally by processor 12 and sent to the control center after calculation. In another embodiment, the processor 12 only handles the direct collection of data and the stress factor is calculated remotely at the control center. The local-calculation embodiment requires greater processing power, but as the stress computations are simple and algebraic in nature, the overall power requirements of the system are expected to be low, achievable by off-the-shelf microprocessor development kits.

Battery 16 is preferably a compact, rechargeable lithium-ion or other suitable battery which can support a minimum of 1,000 charge/discharge cycles. Screen 18 allows the operator to self-assess their biometrics as well as provides an indication of the battery status. Screen 18 may also be utilized to transmit messages to or from the operator to the control center.

Biometric sensors 20 may comprise any type of sensor capable of gathering autonomic medical data from the wearer of the biometric device 10. Data gathered by the biometric sensors 20 may include, but is not limited to: pulse rate (via optical/infrared light sensor or miniature electrocardiogram), blood pressure (via sphygmomanometer), blood oxygen saturation (via pulse oximeter), perspiration levels (via skin conductivity sensor), and/or temperature (via digital thermometer). Biometric sensors 20 may be located on primary biometric device 10, secondary biometric device 11, or within the vehicle itself (e.g., pulse rate may be measurable by embedding biometric sensors within the steering wheel).

Environmental sensors 21 may comprise, for instance, opto-chemical sensors, a biomimetic sensor, or an electronic sensor for detecting the presence of harmful atmospheric conditions, such as elevated carbon monoxide, or fuel emission particulates.

Motion sensors 22 may comprise any type of sensor capable of tracking the movement of the operator. Data gathered by the motion sensors 22 may include but is not limited to: acceleration (via accelerometer), rotation (via gyroscope), and orientation (via compass). Motion sensors may be located on either the primary biometric device 10, secondary biometric device 11, or within the vehicle itself (e.g., a compass embedded within the rear-mirror or dashboard).

Returning now to FIG. 2, data gathered by biometric sensors 20 and motion sensors 22 is directed to transceivers 24. Transceivers 24 comprise any device capable of both receiving and transmitting data. Transceivers 24 may utilize a variety of protocols, including but not limited to: RFID, Bluetooth, Wi-Fi, LTE, GPS, or combinations thereof. A preferred embodiment of the invention utilizes more than one of the listed protocols in order to compensate for weaknesses in each (e.g., RFID for short-range communication between sensors in a given vehicle, and LTE for communication with a remote control center.

Electronic Control Module

Figure 3:
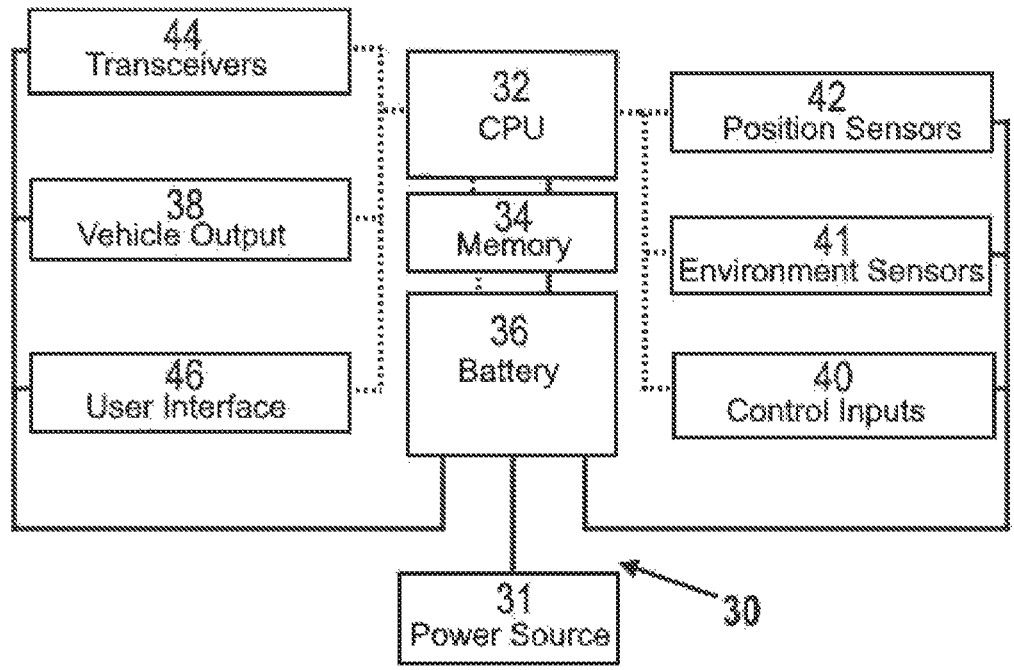
FIG. 3 depicts a block diagram of the electronic control module usable with an embodiment of the present invention.

Turning now to FIG. 3, an electronic control module 30 comprises the second subsystem of the present invention. As with biometric device 10, electronic control module comprises a processor 32, memory 34, and battery 36. (All processor, memory, and battery modules are separate from the corresponding modules used in biometric device 10 for redundancy.) As the electronic control module 30 is in operative association with the vehicle power source 31 rather than the operator, these components may comprise higher-power versions of the components used in biometric device 10 (e.g., a larger battery for longer continuous operation between recharges, or a capacitor connected directly to a vehicle.)

Also as with biometric device 10, electronic control module comprises position sensors 42 and transceivers 44. These position sensors 42 and transceivers 44 perform the same role and may comprise the same types of instruments and protocols as position sensors 22 and transceivers 24 on biometric device 10 (although, as with the other modules, these are separate, redundant devices). For instance, an accelerometer as a position sensor 42 would be usable to detect the speed of the vehicle, while an accelerometer as a position sensor 22 would be usable to detect movement of the operator within the vehicle. Position sensors 22 and 42 may be used in concern to track the operator's location around the vehicle with greater accuracy than achievable by position sensor 22 in isolation.

Unlike biometric device 10, control inputs 40 comprise sensors which are mounted on the vehicle itself and may be used in conjunction with position sensors 22 and 42 to further triangulate the location of the operator in relation to the vehicle, as well as conventionally to detect and record nearby traffic conditions, obstacles, signage, etc. Control inputs 40 may comprise cameras, laser sensors, radar sensors, ultrasonic sensors or combinations thereof. In an exemplary embodiment, control inputs 40 are located in both the cab of the vehicle as well as the cargo area of the vehicle.

Additionally, the electronic control module may comprise environmental sensors 41 which perform a similar function to the environmental sensors 21 on an embodiment of the wearable biometric device 10. Environmental sensors 41 may comprise opto-chemical sensors, biomimetic sensors, electronic sensors, etc. As with the biometric sensors, these may be positioned within the vehicle itself for optimal data collection (e.g., collecting readings from an air conditioning vent in order to monitor for elevated levels of carbon monoxide which may necessitate suspension of vehicle operation when exceeding safety thresholds).

Electronic control module 30 also comprises an automated vehicle output 38. Automated vehicle output 38 operatively connects electronic control module 30 to the steering and braking outputs of the vehicle and enables the electronic control module 30 to temporarily override the operator's input and assume direct control over the vehicle, e.g., to apply brakes or limit speed when the position sensor 42 detects that the vehicle is exceeding maximum safe operating speed.

Electronic control module 30 also comprises user interface 46. User interface 46 may comprise an audio system with a microphone input and a speaker output, a video system with video input and video output, a haptic system with a touch-screen, or combinations thereof. User interface 46 allows the operator to interact with both the electronic control module 30 and also with the control center.

User interface 46 may also be useful from a recording standpoint; for instance, microphones might record cabin sounds or alert the control center if the decibel level reaches a predetermined threshold. In an embodiment, a user interface 46 comprising video input/output is only activated when the vehicle is in park, so as to ensure the operator is not distracted during communication.

Stress Analysis Software

The stress algorithm can be run either on processor 12, processor 32, or at the control center. Stress algorithm takes the biometric inputs received from biometric sensors 20 on biometric devices 10, 11 and quantifies the stress level of the operator by comparing the biometric inputs received with a baseline resting value which is included in the memory 14 of the biometric devices 10, 11. This baseline resting value may be calculated from each operator based on clinical assessments made of each operator prior to their being assigned a vehicle and a destination within the system, so as to more accurately baseline the results. For instance, an operator with better physical fitness may have a lower resting pulse rate.

The preferred stress algorithm will assign one of three classifications to the operator's biometric data. A "normal" classification will be assigned to biometric data close to the baseline resting value within a lower/upper bound. A "stressed" classification is assigned to biometric data which exceeds the upper bound of the normal classification. A "critical" classification is assigned to biometric data which exceeds the upper bound of the stressed classification. This allows the system to direct different interventions for different classifications. For instance, a stressed classification may simply warrant a check-in with the control center through the user interface 46, while a critical classification may trigger a remote shutdown of the vehicle through automated vehicle output 38. In another embodiment, the stressed and critical classifications may also comprise low readings, e.g., a blood pressure reading significantly dropping may signal fatigue, blurred vision, and a risk of fainting due to hypotension.

In an embodiment, multiple biometric markers (e.g., pulse rate and blood pressure) are quantified into a single index variable. This single index variable allows the system not only to assign different interventions based on an operator's biometric output, but to prioritize those interventions within a given band of concern. For instance, an operator whose biometric readings are on the high end of the stressed classification may be prioritized for a check-in through user interface 46 ahead of an operator whose biometric readings are just barely beyond the border between normal and stressed. By averaging multiple biometric markers, the system also reduces the chance of false positives, e.g., an operator's blood pressure may be slightly and temporarily elevated simply due to eating.

EXAMPLE

By way of example, a specific embodiment of the stress analysis is depicted in Tables 1-2.

Table 1 depicts a normal value for heart rate (BPM), systolic blood pressure (SBP), and diastolic blood pressure (DBP). Each normal value is then extrapolated using a "zone factor" for each measurement, representing the coefficients determined to constitute "normal," "stressed," and "critical" classifications. (These zone factors are provided by way of illustration and with no intent to limit the invention to the depicted embodiment. Zone factors may be selected based on the anticipated stress levels of the job and risk tolerance of the system operator).

TABLE 1

| Measurement | Lower Bound "Normal" | | Average "Normal" | | Upper Bound "Normal" | | Upper Bound "Stressed" | | Lower Bound "Critical" | |
|---|---|---|---|---|---|---|---|---|---|---|
| BPM/ZF | 60 | −0.25 | 80 | 0 | 100 | 0.25 | 153 | 0.91 | 154 | 0.93 |
| SBP/ZF | 85 | −0.29 | 120 | 0 | 121 | 0.01 | 180 | 0.50 | 181 | 0.51 |
| DBP/ZF | 55 | −0.31 | 80 | 0 | 81 | 0.01 | 110 | 0.38 | 111 | 0.39 |

As can be seen from Table 1, each biometric marker has its own zone factor. For instance, since the American Heart Association (AHA) defines a "normal" heart rate as having an upper and lower bound (60-100 bpm), the "normal" range has a considerable zone factor for both lower and upper bounds. However, since "normal" blood pressure is defined by the AHA with respect only to a maximum (120 mmHg or less), the zone factor for the upper bound of normal is considerably smaller.

Table 2 shows how these zone factors are further refined when applied to data collected from a newly-hired operator who is subjected to a baseline examination revealing a resting heart rate, systolic, and diastolic blood pressure of 75 bpm, 115 mmHg, and 75 mmHg, respectively. From these values, an upper and lower bound for "normal" classification can be calculated, as well as bounds for a "stressed" classification and a "critical" classification.

In Table 2, the values collected from the baseline examination are adjusted by the zone factor coefficient from Table 1 to arrive at the lower and upper bounds for "normal," as well as the boundary between "stressed" and "critical."

TABLE 2

| Measurement | Lower Bound "Normal" | Measured "Normal" | Upper Bound "Normal" | Upper Bound "Stressed" | Lower Bound "Critical" |
|---|---|---|---|---|---|
| BPM | 56 | 75 | 94 | 143 | 144 |
| SBP (mmHg) | 82 | 115 | 116 | 173 | 174 |
| DBP (mmHg) | 52 | 75 | 76 | 104 | 105 |

In an embodiment, these values can be further refined and recalculated over time based on data collection from the operator, as more "normal" data is collected. In an embodiment, a system operator may accumulate weeks or months of biometric data to reduce the rate of false positives (biomarkers interpreted as "stressed" but which represent normal variation) and false negatives (biomarkers interpreted as "normal" when the operator is actually stressed) before fully implementing the system as described herein.

Control Center

Figure 4:
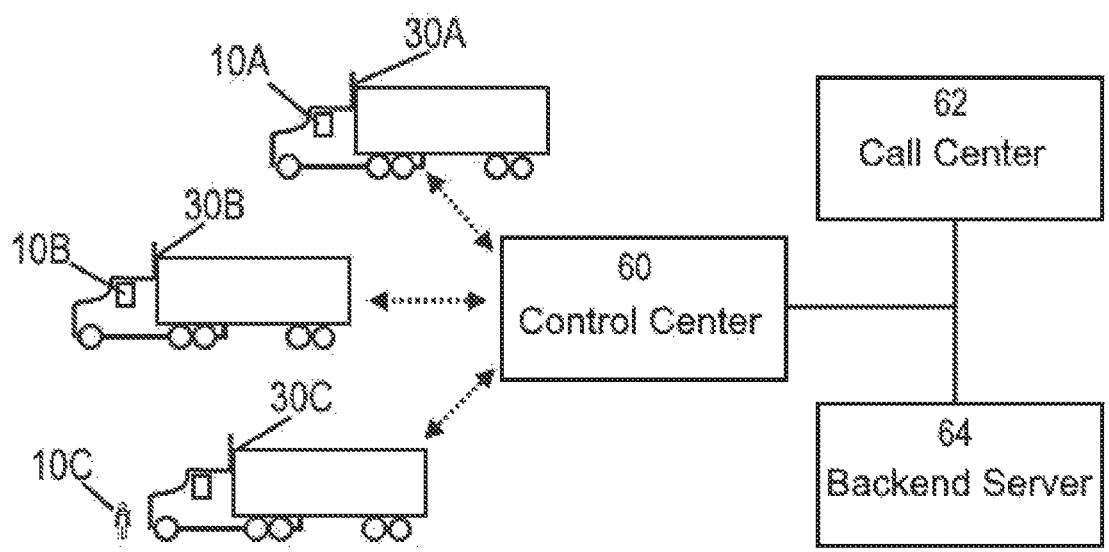
FIG. 4 depicts a diagram of the system as a whole as seen by the control center in accordance with an embodiment of the present invention.

Turning now to FIG. 4, a control center 60 coordinates the above subsystems. Control center 60 comprises a call center 62 as well as a back-end server system 64 connected to the other subsystems, each of which is associated with an individual operator and associated individual biometric devices 10A-10C and electronic control modules 30A-30C. Electronic control modules 30A-30C relay information coming from sensors disposed about the vehicle itself, while biometric devices 10A-10C relay information about the operators. As shown, biometric device 10C will continue to transmit information about operator even if the operator has exited vehicle 30C (for instance, to refuel).

Call center 62 is staffed by operators who contact operators whose biometric data show that they are exceeding the baseline resting value as described above. Call center 62 also performs the ordinary logistics-related role of a driving center, i.e., to schedule, re-route, and/or direct operators as required by the payload schedule.

Back-end server system 64 aggregates all the data and information collected from biometric devices 10A-10C and electronic control modules 30A-30C. Back-end server system comprises at least a data listening service, a real-time graphical display, and a persistent storage and logging system. Data listening service interfaces with the transceivers from biometric devices 10A-10C and electronic control modules 30A-30C. Real-time graphical display allows call center 62 to visually assess the status of the operators through a real-time overlay (for instance, overlaying GPS data onto a map program) and detect stress spikes or lost connections.

Persistent storage and logging system allows the building of profiles and driving logs for each individual operator in the system, building on the resting biometric data gathered from the operator during the initial setup. All such data will be stored and indexed for easy searching and will subsequently allow the stress analysis algorithm to be iterated and refined.

While various embodiments usable within the scope of the present disclosure have been described with emphasis, it should be understood that within the scope of the appended claims, the present invention can be practiced other than as specifically described herein.

The invention claimed is:

1. A system for tracking and control of multiple vehicles in a vehicle fleet, the system comprising:
   at least one electronic control module operatively connected to each vehicle of the multiple vehicles, the electronic control module collecting at least one telemetry measurement;
   at least one wearable module collecting at least one biometric measurement from each operator operating each vehicle of the multiple vehicles;
   a control center receiving the at least one telemetry measurement and the at least one biometric measurement from each vehicle of the multiple vehicles; and
   at least one processor configured to continuously analyze the telemetry measurements and biometric measurements, wherein the at least one processor can initiate a shutdown of any vehicle of the multiple vehicles through the at least one electronic control module when the at least one telemetry measurement, at least one biometric measurement, or both, exceed a predetermined threshold, wherein the predetermined threshold and an intermediate threshold for the at least one biometric measurement is calculated for each individual vehicle operator with respect to a baseline figure derived from a physical examination of the individual vehicle operator, wherein the intermediate threshold is between the predetermined threshold and the baseline figure, and wherein exceeding the intermediate threshold results in a signal to the control center.

2. The system of claim 1, wherein the at least one wearable module comprises a primary biometric device and a secondary biometric device, wherein the primary biometric device and secondary biometric devices collect the at least one biometric measurement simultaneously.

3. The system of claim 1, wherein the at least one biometric measurement comprises pulse rate, blood pressure, blood oxygen saturation, perspiration levels, temperature, or combinations thereof.

4. The system of claim 1, further comprising an environmental sensor located in each vehicle of the multiple vehicles, collecting at least one environmental measurement from each vehicle of the multiple vehicles, and wherein the at least one processor may continuously analyze the at least one environmental measurement and initiate a shutdown of any vehicle of the multiple vehicles when the at least one environmental measurement exceeds a predetermined threshold.

5. The system of claim 1, wherein the at least one telemetry measurement is carried out by means of a camera signal, laser sensor, radar sensor, ultrasonic sensor, or combinations thereof.

6. The system of claim 1, wherein the electronic control module further comprises a user interface allowing interaction between an operator located in a vehicle and an operator located at the control center.

7. The system of claim 1, wherein the baseline figure is periodically re-calculated based on the at least one biometric measurement, and wherein the predetermined threshold and the intermediate threshold are also periodically re-calculated based on the re-calculated baseline figure.

8. The system of claim 1, wherein the control center receives the at least one telemetry signal and the at least one biometric signal via a wireless protocol, including RFID, Bluetooth, Wi-Fi, LTE, GPS, or combinations thereof.

9. The system of claim 1, wherein the wearable module further comprises at least one motion sensor capable of detecting movement of the operator within the vehicle.

10. The system of claim 9, wherein the at least one motion sensor comprises an accelerometer, gyroscope, compass, or combinations thereof.

* * * * *